H. D. MATTHEWS.
PROTECTIVE DEVICE.
APPLICATION FILED AUG. 1, 1916.
1,269,481.
Patented June 11, 1918.
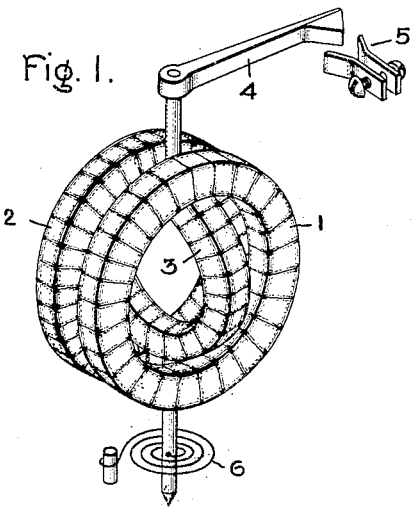
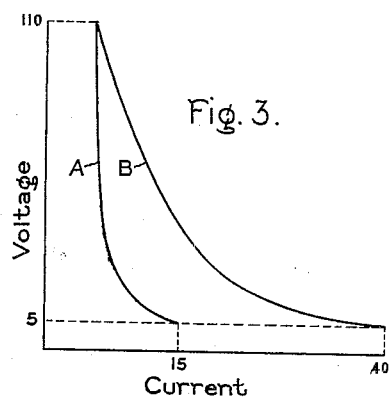
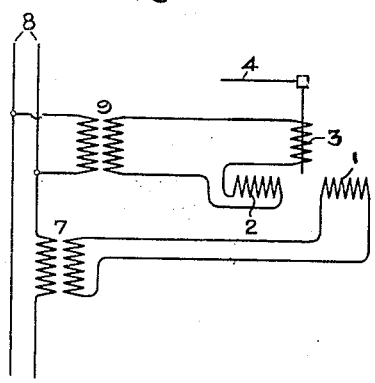
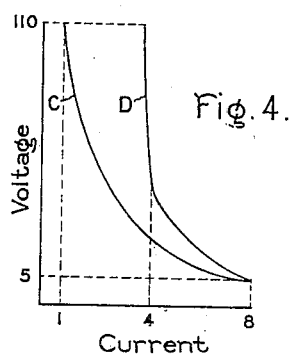
Inventor:
Howard D. Matthews,
by Albert G. Davis
His Attorney.

UNITED STATES PATENT OFFICE.

HOWARD D. MATTHEWS, OF SCHENECTADY, NEW YORK, ASSIGNOR TO GENERAL ELECTRIC COMPANY, A CORPORATION OF NEW YORK.

PROTECTIVE DEVICE.

1,269,481.      Specification of Letters Patent.      Patented June 11, 1918.

Application filed August 1, 1916. Serial No. 112,602.

*To all whom it may concern:*

Be it known that I, HOWARD D. MATTHEWS, a citizen of the United States, residing at Schenectady, county of Schenectady, State of New York, have invented certain new and useful Improvements in Protective Devices, of which the following is a specification.

My invention relates to protective devices for electric systems or apparatus and more specifically to relay devices of the reverse power type.

The object of my invention is to provide a novel and improved device for protecting distribution systems and apparatus installed on such system under conditions of reversal of power or energy flow and more particularly to provide an improved reverse power relay which is not sensitive to certain conditions of reversal but very sensitive to other conditions of reversal.

The novel features which I believe to be characteristic of my invention will be definitely indicated in the claims appended hereto; the features of construction and mode of operation will be understood by reference to the following description taken in connection with the accompanying drawing which show the preferred embodiments of my invention and in which Figure 1 shows a relay device embodying the features of my invention, Fig. 2 shows diagrammatically the connections for my relay to a circuit to be protected and Figs. 3 and 4 are voltage current curves showing the characteristics of my relay compared with a relay of the ordinary type.

I have shown in Fig. 2 the principle of my invention embodied in a relay of the dynamometer type which comprises two fixed or stationary elements or coils 1 and 2 inductively related and a movable element or coil 3 located in the magnetic field set up by the coils 1 and 2, the movable coil carrying the contact arm 4, as best shown in Fig. 1, coöperating with contacts 5 to control a tripping circuit. As shown in Fig. 1, a spring member or resilient means 6 under normal conditions holds the movable coil 3 in its initial position and also the contact arm 4 in position out of engagement with the contacts 5.

According to my invention, I connect one of the fixed or stationary coils 1 in the secondary circuit of a series or current transformer 7 connected in the line 8 and the other fixed coil 2 in series with the movable coil 3 and in the secondary circuit of a potential transformer 9. It is understood, however, that coils 2 and 3 may be connected in separate secondary circuits of potential transformers if desired. Coil 1, therefore, responds to the current and coils 2 and 3 to the potential of the circuit 8 to be protected and I have thus provided a relay responsive to reversals of power or energy flow in the circuit 8. It is understood that the secondary circuits of the transformers 7 and 9 are so related that the currents passing through the relay coil 1 and coils 2 and 3 under normal conditions, are in the proper phase relation. The coils 1 and 2 are in the same magnetic circuit and so arranged that the magnetic field or flux set up by each coil is in the same direction and assist each other to produce a resultant field or flux having such a phase relation to the field or flux set up by the movable potential coil 3 that this potential coil tends to move normally in a direction to maintain the contacts 5 open.

Upon reversal of energy flow caused, for instance, by a short circuit, the current in the current coil increases slightly and reverses relative to the potential circuit causing a reversal and a slight increase of the field or flux set up by the coil 1. The flux set up by the potential coil 2 does not reverse but decreases in amount dependent upon the drop in voltage caused by the short circuit so that under conditions of reversal, the resultant flux of the coils 1 and 2 is the flux of current coil 1 opposed or restrained by the flux of potential coil 2. As the flux of the potential coil 2 decreases in proportion to the severity of the short circuit, the flux of the current coil 1 overcomes the flux of the potential coil 2 and the resultant flux is in the direction of the flux of the current coil 1 which resultant flux is therefore reversed from the normal resultant flux. The movable potential coil 3 being therefore under the influence of this reversed resultant flux and having its flux in the normal direction, moves in the reverse direction and carries contact arm 4 to close contacts 5 and operate the tripping circuit.

A reverse power relay of the ordinary dynamometer type comprising current and potential elements when rendered sufficiently sensitive to operate on reversals caused by short circuits of large voltage drop are so sensitive on momentary reversals where the voltage does not drop appreciably, such as in synchronizing operations, that the relays operate when it is not desired that they should. If the sensitiveness of such relays is reduced so as not to operate under conditions of reversal above mentioned, then upon reversals with a large drop in voltage the relays do not operate when they should due to the large amount of current necessary to operate them. The relay of my invention overcomes these difficulties. I provide a relay which has a movable potential coil 3 operative in a field which is the resultant of a field produced by a potential coil 2 and a current coil 1, which normally assist each other but which upon reversal of the field of the current coil due to reversals of power on the circuit, the flux of the current coil 1 is opposed or restrained by the flux of the potential coil 2. Thus more current is required to overcome the opposing flux of the potential coil 2 under conditions of reversal with slight drop in voltage than it does with reversal with a great drop in voltage as the opposing flux of the potential coil 2 varies with the potential. My relay is, therefore, not sensitive to reversals of power with slight drop in voltage, such as often results from synchronizing operations, but is sensitive to reversals with a great drop in voltage such as due to short circuits and I obtain therefore a relay with very beneficial and important characteristics and by varying the magnitude of the flux relations between the potential coil 2 and current coil 1, relays of a variety of operating characteristics can be obtained.

The comparison of operating characteristics between my relay and a relay of the ordinary type is clearly brought out by the curves shown in Figs. 3 and 4. In Fig. 3 is shown the voltage current curve A of my relay and a representative voltage current curve B for a relay of the ordinary type. In this instance it is assumed that both relays are arranged to operate on reversals of 5 amperes at normal potential which is shown as 110 volts, that is both relays have their coils so constructed that at reversals with only slight drop of potential that they are equally sensitive. Suppose now a reversal occurs in which the voltage drops to 5 volts. As shown by curve A my relay will require but 15 amperes in the current coil to operate while the relay of ordinary type requires 40 amperes, a value of current which is often too high to be obtained and hence the ordinary relay is inoperative. My relay, therefore, is much more sensitive on reversals with large drop in voltage as it requires less current to operate. This can be explained as follows. Suppose for example, that in the ordinary dynamometer type relay it is assumed that it takes 100 ampere turns to produce sufficient flux on 5 amperes to operate the relay. In my relay for the same sensitivity we will consider the potential coil 2 has 50 ampere turns, then the current coil 1 must have 150 ampere turns to produce a resultant effect of 100 ampere turns on reversal, as upon reversal the potential coil 2 then opposes with the effect of 50 ampere turns considering there is only a slight drop in voltage. Now if the voltage drop on reversal is to 5 volts, the 100 ampere turns of the coil of the ordinary relay must have a current of 60 amperes to operate the relay while in my relay with a drop in voltage on reversal to 5 volts the effective ampere turns of the potential coil 2 is reduced and hence the opposing or restraining action on the flux of current coil 1 is reduced so that it will take less ampere turns to produce a flux necessary to overcome the flux due to the restraining potential coil 2 and hence less current as is shown by the curve.

As showing the same relation from another point of view, consider the curves C and D of Fig. 4. These curves are the voltage current curves for relays of the ordinary type, shown by curve C, and of my relay, shown by curve D, which have their coils so constructed that the relays have the same sensitivity on reversals in which the voltage drops to 5 volts. Under reversals in which the drop in voltage is slight, it will be seen by curve C that the relay of the ordinary type is operative on reversals of 2 amperes while my relay will not operate on such reversals on less than 6 amperes. Hence my relay will not operate under such reversals such as is caused by synchronizing while the ordinary relay will operate which operation is undesirable. This is due to the fact that under these conditions, the potential restraining coil 2 of my relay exerts sufficient restraining action to prevent operation of the relay unless a current of 6 amperes passes through the current coil 1 which current is necessary to overcome the flux of the potential coil 2.

What I claim as new and desire to secure by Letters Patent of the United States, is:

1. A relay of the dynamometer type comprising a fixed potential element and a fixed current element coöperating to produce a resultant magnetic field, the field produced by said potential element normally aiding the field produced by said current element but under abnormal conditions opposing the field of said current element by a force which is a measure of the potential, and a second potential element movable in said resultant field.

2. A relay of the dynamometer type comprising fixed current and potential elements in inductive relation, producing a resultant magnetic field, the field of said potential element normally assisting the field of said current element but under abnormal conditions opposing the field of said current element by a force which is a measure of the potential, and a second potential element producing a magnetic field coacting with said resultant magnetic field and movable in a direction depending upon the relation of said coacting fields.

3. A relay of the dynamometer type comprising fixed current and potential elements in the same magnetic circuit producing a resultant magnetic field, the field of said current element being normally assisted by the field of said potential element but under abnormal condition being opposed by the field of said potential element, and a second potential element producing a field which coacts with said resultant field to move in a direction dependent upon the relation of said coacting fields.

4. A reverse power relay of the dynamometer type comprising relatively movable coöperating current and potential elements, and a second potential element in the magnetic circuit of said current element operative on reversal of power to produce a field opposing the field of said current coil the intensity of which is a measure of the potential.

5. A relay of the dynamometer type comprising three coils, a movable coil responsive to potential, a fixed current coil, and a second fixed coil in series with said movable potential coil and in inductive relation with said current coil.

6. A relay of the dynamometer type comprising three elements, a current and a potential element in the same magnetic circuit producing a resultant magnetic field which is the algebraic sum of the fields produced by said current and potential elements, and a movable potential element producing a field which coacts with said resultant field.

7. A reverse power relay of the dynamometer type comprising relatively movable coöperating current and potential elements, and a potential restraining element inductively related to said current element and producing a flux which normally assists the flux of said current element but under conditions of reverse power opposes the flux of said current coil by a force which is a measure of the potential.

8. A reverse power relay of the dynamometer type comprising relatively movable coöperating current and potential elements, and a second potential element in the magnetic circuit of said current element for restraining the magnetic field set up by said current element under condition of reverse power by a force which is a measure of the potential.

9. In combination with an electric circuit, of means for protecting said circuit under conditions of reversal of power comprising a relay of the dynamometer type having fixed current and potential coils producing a resultant magnetic field, and a movable potential coil producing a coacting magnetic field, and contacts controlled by said movable potential coil, said magnetic fields being so related under conditions of reversal with large drop in voltage that said potential coil moves into contact engaging position while under conditions of reversal with slight drop in voltage said potential coil is maintained out of contact engaging position.

In witness whereof, I have hereunto set my hand this 31st day of July, 1916.

HOWARD D. MATTHEWS.

Copies of this patent may be obtained for five cents each, by addressing the "Commissioner of Patents, Washington, D. C."